(12) United States Patent
Pederson

(10) Patent No.: US 7,318,468 B2
(45) Date of Patent: Jan. 15, 2008

(54) GLUED LOST FOAM CASTING PATTERN ASSEMBLY

(75) Inventor: Thomas C. Pederson, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 59 days.

(21) Appl. No.: 11/430,620

(22) Filed: May 9, 2006

(65) Prior Publication Data

US 2006/0254740 A1    Nov. 16, 2006

Related U.S. Application Data

(60) Provisional application No. 60/679,323, filed on May 10, 2005.

(51) Int. Cl.
*B22C 7/02*    (2006.01)
*B22C 9/04*    (2006.01)

(52) U.S. Cl. .......................... 164/235; 164/34; 164/45
(58) Field of Classification Search ............ 164/34–36, 164/516–519, 45, 235, 246
See application file for complete search history.

(56) References Cited

FOREIGN PATENT DOCUMENTS

JP    2002-307133    * 10/2002

* cited by examiner

*Primary Examiner*—Kuang Y. Lin

(57) ABSTRACT

Lost foam pattern assemblies formed by gluing together a plurality of EPS foam pattern segments with a polystyrene-like glue comprising an aromatic resin that has a molecular weight less than 10,000 and thermally degrades at temperatures no greater than said EPS. The glue contains sufficient first plasticizer, miscible with the resin, to impart a viscosity of about 0.1 to 5 PaS @ about 100-135° C. to the glue. The glue may optionally include a second, limited-miscibility, plasticizer to accelerate the hardening rate and increase the ultimate rigidity of the glue.

7 Claims, 1 Drawing Sheet

GLUED LOST FOAM CASTING PATTERN ASSEMBLY

CROSS REFERENCE TO RELATED APPLICATION

This application claims priority to U.S. Provisional Ser. No. 60/679,323 filed May 10, 2005.

TECHNICAL FIELD

This invention relates to EPS pattern assemblies used for the "lost foam" casting of aluminum, and more particularly, to hot melt adhesives used to make such pattern assemblies.

BACKGROUND OF THE INVENTION

The so-called "lost-foam" casting process is a well-known technique for producing aluminum castings, wherein a fugitive, pyrolizable, polymeric foam pattern [e.g. expanded polystyrene foam (EPS)] is covered with a thin (i.e. 0.25-0.5 mm), gas-permeable, refractory (e.g. mica, silica, alumina, alumina-silicate, etc.) coating, and embedded in compacted, unbonded sand to form a pattern-filled, mold cavity within the sand. The most popular pattern foam for casting aluminum is high mass average molecular weight (i.e. $M_w > 200,000$) expanded polystyrene (EPS). Molten aluminum (hereafter "melt") is introduced into the pattern-filled mold cavity to liquefy, thermally degrade and displace the pattern with melt. Gaseous and liquid decomposition/pyrolysis products from the thermally degraded foam escape through the gas-permeable refractory coating into the interstices between the unbonded sand particles.

The melt may be either gravity-cast (i.e. poured from an overhead ladle or furnace), or countergravity-cast (i.e. forced upwardly by vacuum or low pressure into the mold cavity from an underlying vessel (e.g. a furnace). Faster casting rates (i.e. the rate at which the melt enters the mold cavity) result in less heat loss during pouring. Less heat loss during pouring keeps the melt hotter, which in turn, reduces the formation of casting defects such as "folds" (i.e. thermal degradation products trapped at the confluence of cold metal fronts), "cold shuts" (i.e. sites where metal does not completely fill the pattern due to premature solidification), and "gas inclusions" (i.e. pyrolysis gases entrapped in solidified melt before they can escape the mold cavity).

The EPS foam pattern is made by injecting pre-expanded polystyrene beads into a steam-heated pattern mold to impart the desired shape to the pattern. Complex patterns are made by separately molding several individual/discrete mold segments (a.k.a. "slices"), and then gluing the individual segments together to form a finished "pattern assembly". Paraffinic hot melt glues are commonly used to form pattern assemblies, but can contribute to the formation of casting defects. In this regard, the paraffinic glues tend to resist thermal degradation ahead of the melt front advancing into the pattern. Undegraded glue in the mold cavity impedes advancement of the melt front which, in turn, promotes localized heat loss, and the associated formation of the aforesaid casting defects, as well as defects resulting from entrapment of any solid glue residues in the casting.

SUMMARY OF THE INVENTION

The present invention seeks to reduce the formation of casting defects in aluminum castings made using EPS foam pattern assemblies by using hot melt glues therewith that emulate the thermal degradation characteristics of the EPS used to form the pattern, in that they thermally degrade, residue-free, at least as fast as the EPS foam at the temperatures experienced by the EPS as the melt front advances into pattern. More specifically, the present invention contemplates a pattern assembly for the lost foam casting of aluminum, which assembly includes at least two discrete high $M_w$ EPS foam mold segments glued together by a glue that comprises: (1) an aromatic resin [preferably poly-α-methylstyrene, and/or poly (styrene-co-methylstyrene)] that has a molecular weight ($M_w$) less than 10,000 [preferably ca. 1500 to ca. 3000], and thermally degrades at temperatures no greater than the EPS mold segments thermally degrade; and (2) sufficient first plasticizer miscible with the resin to impart a viscosity of about 0.1-5 PaS @ about 100° C.-135° C. to the glue. Preferably, the aromatic resin is synthesized from aromatic monomers of the type found in the C-9 aromatic distillate fraction resulting from the fractional distillation of petroleum, and are hereafter referred to as C-9 aromatic resins. For economic reasons, the aromatic monomer comes from the C-9 fraction, and the C-9 aromatic resin results from the polymerization of the C-9 aromatic fraction itself. The glue may optionally contain a second plasticizer, having limited miscibility with the resin.

DETAILED DESCRIPTION OF THE INVENTION

Figure 1:
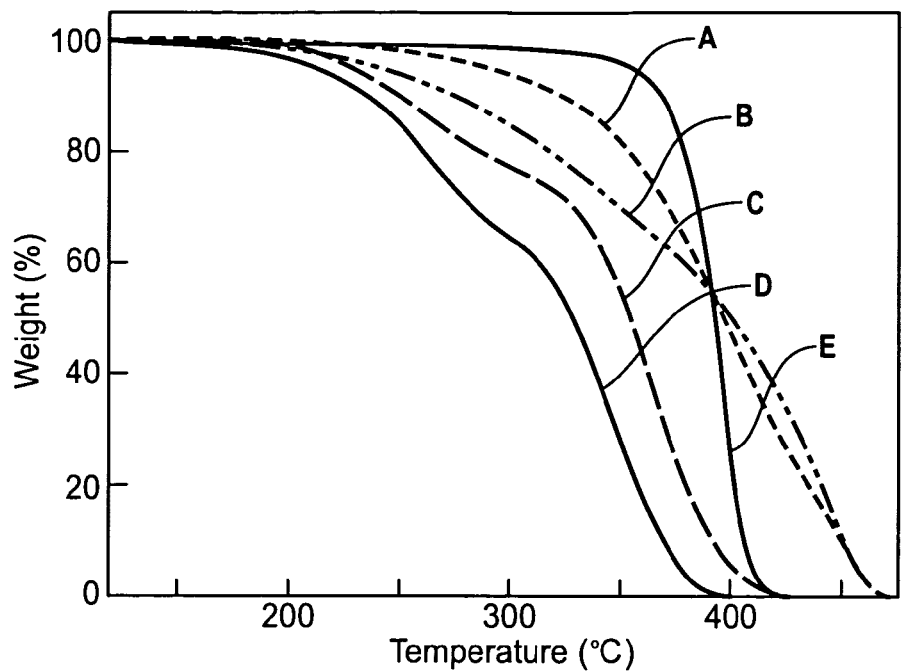
FIG. 1 is a graph comparing the thermal degradation profiles of (a) T170 EPS beads, (b) two commercial pattern glues, and (c) two glues in accordance with the present invention.

The invention involves expanded polystyrene (EPS) lost foam pattern assemblies having two or more segments bonded together with a glue that emulates the thermal degradation characteristics of the EPS so as not to impede the advancement of the melt front into the pattern any more than the EPS itself. To this end, the glue comprises an aromatic resin that (1) has a molecular weight ($M_w$) less than 10,000, (2) is derived from one, or from a mixture of several, aromatic monomer(s) of the type found in the C-9 aromatic fraction, and (3) thermally degrades as fast, or faster, than the EPS at the same temperatures and heating rates. Effective resins have been made by polymerizing a purified monomer such as styrene or methylstyrene, or mixtures thereof with each other, or with other C-9 type aromatic monomers. Indeed, effective glues have been made by polymerizing the C-9 aromatic fraction itself. Principle aromatic monomers commonly found in the C-9 aromatic fraction include styrene, methylstyrene, vinyltoluenes, indene, and methylindenes, inter alia.

A first plasticizer is added to the resin to impart a viscosity (i.e. about 0.1-5 PaS @ 100° C.-135° C.) to the glue which is compatible with the flow requirements of the gluing machine used to apply the glue to the segments. The glue contains the least amount of plasticizer possible to achieve the needed viscosity. The relative proportions of resin and plasticizer depends on the molecular weight ($M_w$) of the resin. The higher the molecular weight ($M_w$), the more plasticizer is needed, i.e. as much as 40% by weight of the glue for resins having a molecular weight ($M_w$) of 9000. Above a resin molecular weight ($M_w$) of 10,000, the amount of plasticizer needed to meet the requisite viscosity is unacceptably high. Lower molecular weight ($M_w$) resins (e.g. ca. 1000-ca. 3000) are preferred to minimize plasticizer requirements and permit plasticiser contents as low as ca. 10% by weight. Any known plasticizer (e.g.polyglycol-dibenzoate, phthalate esters and trimellitate esters) that is miscible with aromatic resins at the temperatures required by the gluing machine and at room temperature is seen to be useful with the present invention.

In some cases, it is may be optionally desirable to include a small amount (e.g. less than 15%) of a second plasticiser that has limited miscibility with the resin. By limited miscibility plasticizer is meant a plasticizer that is miscibile with the resin at the application temperature of the glue machine, but that separates therefrom during cooling of the resin after the foam segments have been joined. Such secondary plasticizers serve to accelerate the hardening rate of the glue during cooling, as well as ultimately yield a more rigid glue. Any known such plasticizer is useful with the present invention. Diol-adipate polyesters have proven to be effective second plasticizers.

In contrast to paraffinic glues, the glues of the present invention can be applied over the entire interfacial area between abutting segments (so-called "flood-glued"). Paraffinic glues, on the other hand, can only be applied to the perimeter of the interfacial area (so-called "perimeter-glued") if casting defects are to be minimized. Even then, it has been shown that perimeter-gluing often produces glue flash in the region of the joint immediately inboard the perimeter. The flash is formed when the glue migrates from the perimeter of the interfacial region into the interfacial region itself between abutting segments during pattern assembly. Paraffinic glue flash impedes advancement of the melt front.

Summarizing, lost foam pattern glues in accordance with the present invention will comprise, by weight, ca. 60% to ca. 90% resin, ca. 10% to ca. 40% of fully-miscible first plasticizer, and optionally, up to ca. 15% of a limited-miscibility second plasticiser. One specific example of an EPS foam pattern glue in accordance with the present invention comprises, by weight, poly(styrene-co-methylstyrene) resin [70%], polypropyleneglycol dibenzoate [18%] first plasticizer, and poly(1,6-hexanediol/neopentyl glycol-alt-adipic acid [12%] second plasticizer.

FIG. 1 is a graph showing the results of the thermogravametric analysis of (A) a first commercial hot melt pattern glue, (B) a second commercial hot melt pattern glue, (C) a first hot melt glue in accordance with the present invention, (D) a second hot melt glue in accordance with the present invention, and (E) EPS pattern-making foam. The curve (C) glue comprises 65% styrene-co-methylstyrene ($M_w$ 2800) and 35 (%) plasticizer (%). The curve (D) glue comprises 75% styrene-co-methylstyrene ($M_w$ 1300) and 25% plasticizer. FIG. 1 shows that by the time all of the EPS degrades, about 55% of the commercial glues (A) and (B) would still remain to impede the advancement of the melt front. On the other hand, FIG. 1 also shows that glues (C) and (D), of the present invention, would completely degrade by the time the EPS had completely degraded and accordingly would not be present as an impediment to melt flow.

Figure 2:
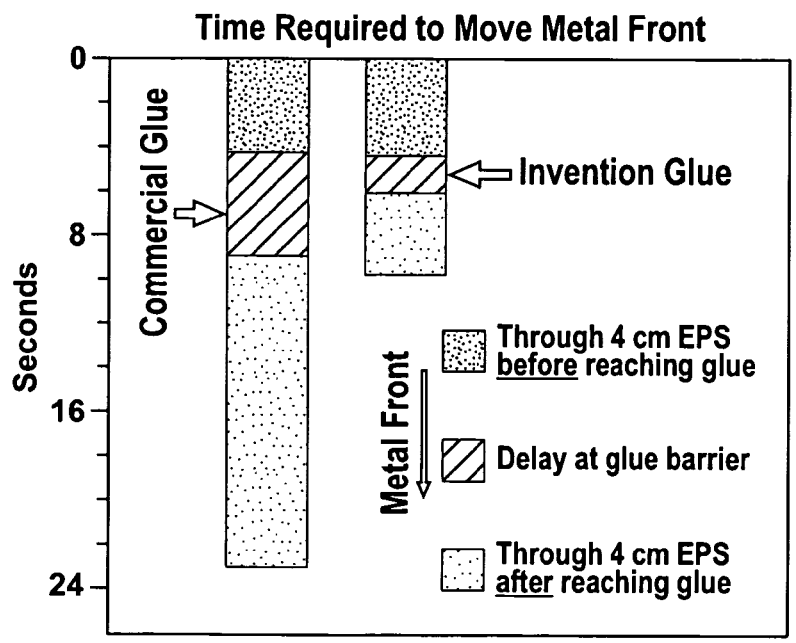
FIG. 2 is a bar graph showing the rate at which the melt front moves through two test pattern assemblies.

FIG. 2 is a bar graph showing the time required to move the metal front through test pattern assemblies that comprised vertically oriented cylinders 8.1 cm long and 1.5 cms in diameter. A 1 mm thick layer of glue was located at the longitudinal center of each cylinder with a 4 cm long column of EPS above and below the layer of glue. A1 melt was poured into the top of the cylinder and the advancement of the metal front through the cylinders observed using real time x-ray imaging. The time required for the melt front to advance through the length of a test cylinder is shown in FIG. 2. The bar graph on the left shows results for a test using a commercial paraffinic glue, and the bar graph on the right shows the results of a test using an aromatic glue in accordance with the present invention. FIG. 2 shows that: (a) it takes the same amount of time to advance the melt front through the 4 cm high EPS columns above both glue joints; (b) it takes almost three times the amount of time for the melt front to pass through the commercial glue joint than through the glue joint of the present invention; and (c) it takes almost four times the amount of time for the melt front to pass through the 4 cm high column of EPS beneath the commercial glue joint than the 4 cm high column of EPS beneath the glue joint of the present invention.

While the invention has been described in terms of certain specific embodiments thereof it is not intended to be limited thereto, but rather only to the extent set forth hereafter in the claims which follow.

The invention claimed is:

1. In a pattern assembly for the lost foam casting of aluminum comprising a plurality of discrete high-molecular-weight EPS mold segments adhered one to the next by glue, the improvement wherein said glue comprises (1) an aromatic resin that has a molecular weight less than 10,000 and thermally degrades at temperatures no greater than said EPS thermally degrades, and (2) sufficient first plasticizer miscible with said resin to impart a viscosity of about 0.1-to about 5 PaS @ about 100°-135° C. to said glue.

2. A pattern assembly according to claim 1 wherein said aromatic resin is synthesized from at least one aromatic monomer of the type found in the C-9 aromatic fraction of petroleum distillate.

3. A pattern assembly according to claim 1 wherein said aromatic resin is selected from the group consisting of poly-α-methylstyrene, and poly (styrene-co-methylstyrene).

4. A pattern assembly according to claim 2 wherein said aromatic monomer comes from said fraction.

5. A pattern assembly according to claim 4 wherein said aromatic resin comprises polymerized said C-9 fraction.

6. A pattern assembly according to claim 1 including a second plasticiser having limited miscibility with said resin to accelerate the hardening rate of, and increase the ultimate rigidity of, said glue following assembly of said segments.

7. In a pattern assembly for the lost foam casting of aluminum comprising a plurality of discrete high-molecular weight EPS mold segments adhered one to the next by glue, the improvement wherein said glue comprises about 70% by wt. poly (styrene-co-methylstyrene), about 18% by wt. polypropyleneglycol dibenzoate, and about 12% by wt. poly (1,6-hexanediol/neopentyl glycol-alt-adipic acid).

* * * * *